Feb. 9, 1960    M. R. WEINGARTEN ET AL    2,924,429
SERVO-MOTOR HOISTING AND HANDLING APPARATUS
Filed Nov. 12, 1954
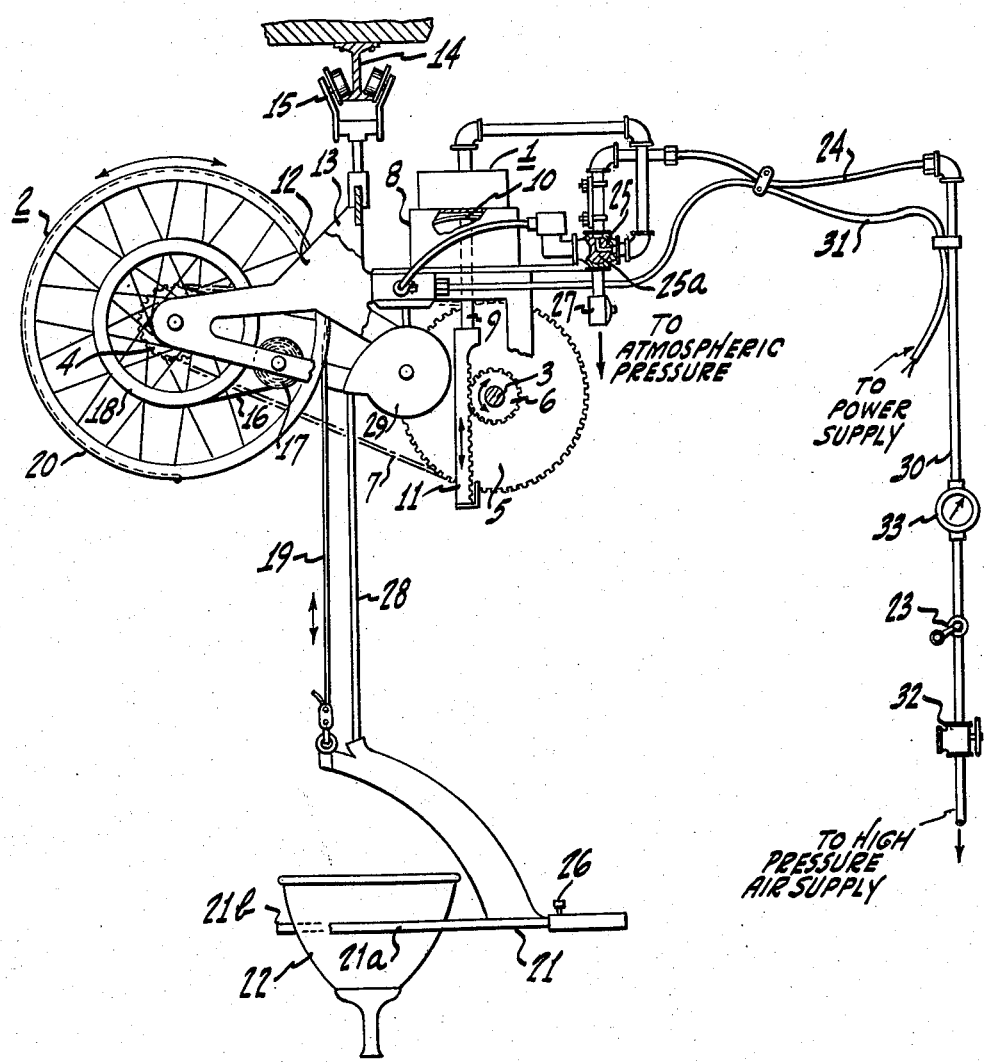
INVENTORS
RALPH M. HOLLINGER
& MORRIS R. WEINGARTEN
BY William A. Zalesak
ATTORNEY

United States Patent Office 2,924,429
Patented Feb. 9, 1960

2,924,429

SERVO-MOTOR HOISTING AND HANDLING APPARATUS

Morris R. Weingarten and Ralph M. Hollinger, Lancaster, Pa., assignors to Radio Corporation of America, a corporation of Delaware The terminal fifteen years of the term of the patent to be granted has been disclaimed Application November 12, 1954, Serial No. 468,452

8 Claims. (Cl. 254—168)

This invention relates to an apparatus for hoisting and handling a work piece. More particularly, it concerns an apparatus for facilitating the movement of a work piece that is too bulky, heavy, or hot to be transferred manually from one location to another.

Lifting devices in forms heretofore known, have not been satisfactory since they so completely took up the load that the operator lost the sense of "feel" necessary for a relatively delicate handling of a relatively heavy work piece. A relatively sensitive lifting apparatus was not available in a satisfactory form so as to allow the operator to exert a relatively small force on a relatively massive work piece to set it in a desired vertical motion.

A further disadvantage of previous lifting devices is that such devices remained stationary at the last position to which they were moved; thus, work pieces were often left in positions in a work area where a relatively fragile work piece might easily be damaged. Previous automatic devices for removing a work piece from the work area required a conscious movement on the part of the operator in order that the work piece be moved out of what might be termed the "danger zone."

Accordingly, it is one of the principal objects of the present invention to provide an improved lifting apparatus wherein a relatively bulky, heavy, or hot work piece may be moved by an operator with a force external of the apparatus which is relatively small in relation to the weight of the work piece.

It is another object of the present invention to provide an improved lifting apparatus wherein automatic means are provided for the counter-balancing of a relatively heavy work piece and wherein the work piece may be moved from one position to another by an operator with the retention, during the moving operation, of the "feel" of the load represented by the work piece.

It is a further object of the invention to provide a lifting apparatus capable of relatively delicate lifting control and wherein the retraction of a relatively light support cradle to an out-of-the-way position is effected, after an operator releases a relatively heavy work piece from the cradle, without a compensation on the part of the operator for the change in load.

In order to accomplish these and other objects, the invention provides a lifting apparatus including a hoisting sheave adapted to raise a cable fixed to a cradle supporting a work piece. The sheave is locked to a shaft which is controlled in rotation by a pneumatically powered diaphragm. The pressure on the diaphragm is adjustable, to permit the object to remain stationary at any given vertical position. A relatively small overriding additional force external to the apparatus, supplied by an operator in a vertical direction, effects a change in the vertical position of the work piece with less force than that represented by the weight of the work piece. The hoisting sheave is spring loaded so as to raise an empty cradle to an overhead out-of-the-way position when the operator hold is released.

Thus the apparatus enables an operator to handle a work piece in a manner so as to retain the sensation of the inertia or "feel" of the work piece without the hinderance of its weight. The apparatus proves useful in the handling of relatively heavy and fragile work pieces such as cathode ray tubes and is especially advantageous for the transport of relatively hot cathode ray tube bulbs during a stage in the manufacture of such tubes.

While the invention is pointed out with particularity in the appended claims it may best be understood from the following detailed description and drawing. The embodiment described is presented solely for illustrative purposes and not by way of limitation.

In the sole figure of the drawing there is shown an elevational view, partly in section, of a lifting apparatus embodying the invention.

Structure

Referring now to the drawing in greater detail, there is shown a lifting apparatus 1 embodying the invention. The lifting apparatus includes a hoisting sheave 2 which is chain driven directly through a sprocket reduction mechanism. The sprocket reduction mechanism includes two sprockets 4 and 5 and a chain 7 which meshes with the sprockets. The larger of the two sprockets, indicated by numeral 5 in the drawing, is fixed to a shaft 3 which is free to rotate in either a clockwise or counter-clockwise direction as viewed in the drawing. A pinion gear 6 is fixed to the shaft 3 to which the larger of the two sprockets is fixed. The hoisting sheave 2 is powered by a pneumatic diaphragm cylinder 8. A cylinder rod 9, which is affixed to a diaphragm 10 within the diaphragm cylinder 8, is attached to a rack 11. The hoisting sheave and the sprocket reduction mechanism are mounted between two side frames 12 and 13. One of the side frames, indicated by numeral 12 in the drawing, is shown partially broken away to reveal the other side frame 13 and some of the parts of the lifting apparatus between the frames. Straight line reciprocating motion of the air cylinder rod 9, and thus of the rack 11, is converted into rotary motion of the hoisting sheave 2. The lifting apparatus 1, which is fixed to the side frames 12 and 13, may be hung from an I-beam track 14 and trolley 15 so that the lifting apparatus can be moved to two or more operating stations if desired.

A recoiling type extension spring 16, which may be mounted in a housing 17 on one of the frames, has an end thereof connected to and wound around an inner rim 18 of the hoisting sheave 2. A hoisting cable 19 which is clamped to the outer rim 20 of the hoisting sheave 2, is wound over and around the outer rim. The cable supports a suitable work holding attachment which is shown in the drawing as a forked cradle 21. The cradle is shown supporting a cathode ray tube 22. One of the prongs 21a of the fork is shown broken away revealing the other prong 21b behind it. It will be appreciated that any suitable work holding cradle may be affixed to the end of the cable. For example, the cradle may be in the form of a hook, prongs, a vacuum chuck, or any other device suitable for securely holding a work piece.

Air under pressure, appreciably above atmospheric, is supplied to the pneumatic diaphragm cylinder 8 from a source of compressed air through a bleed-off type pressure regulator 23, a flexible air hose 24, and then through a two-position solenoid controlled air valve 25. An electric switch 26, which controls the solenoid actuated valve 25, is mounted on the cradle so as to be positioned in relatively easy accessibility to an operator handling or manipulating the cradle. When energized by the switch 26, the solenoid valve 25, in the position shown in the drawing, admits air into the cylinder 8. When the solenoid valve is deenergized, a valve member 25a, within the valve 25, is rotated about 90°

3

(in a clockwise direction for the valve shown in the drawing). In the position to which the valve is rotated the air supply is shut off and the cylinder 8 is exhausted to atmospheric pressure through a throttle type control valve 27. The solenoid valve 25 is mounted on one of the frames 12 and is electrically connected to the electric switch 26 through a three conductor cable 28 carried by a retracting type cable reel 29 which is mounted on the same frame. Cable reels of this type are well known in the trade and therefore further description thereof herein is believed unnecessary. The air pressure regulator 23 is mounted near the operating station to allow for convenient pressure adjustment by the operator. The air line 30 is connected to the solenoid valve 25 by the flexible hose 24, the hose being of a sufficient length to permit travel of the lifting aid 1 within the desired horizontal range of movement. A three conductor supply cable 31 is located adjacent to the flexible hose 24 thereby supplying electrical power to the switch 26 and thus to the solenoid valve 25. A master air pressure control valve 32 may be provided to control the air supply from a source of compressed air. An air pressure gauge 33 may be positioned intermediate the pressure regulator 23 and the cylinder 8 so that the pressure of the air supplied to the cylinder may be readily ascertained.

*Operation*

A description of the operation of the apparatus according to the invention involves a consideration of two aspects. One aspect concerns the operation of the apparatus when empty. The other aspect covers the operation of the apparatus with a work piece therein.

In the absence of a work piece the air cylinder 8 is exhausted to atmospheric pressure. The action of the spring 16 winds the cable 19 over the outer rim 20 of the sheave 2; this raises the cradle to its maximum overhead lifting position. Thus the empty cradle is moved out of the working area or "danger zone."

To set up the apparatus for handling work pieces, certain adjustments are necessary. These adjustments are made when the first of a group of work pieces having substantially the same weight is carried by the apparatus. In making these adjustments the pressure regulator 23 is adjusted while the pneumatic cylinder 8 is pressurized; the adjustment is made so that the force urging the hoist cable 19 in an upward direction is substantially equal to the force in a downward direction produced by the combined weight of the work piece 22, the cradle 21, and the cable itself. Thus the adjustment is such that the load is suspended motionless. When work pieces of substantially the same weight are handled, the adjustment of the air pressure regulator 23 is unchanged.

In positioning a work piece in a cradle, the cradle 21 is pulled down and maneuvered into a position so that the cradle engages the work piece 22 for support thereof. When the cradle used is in the shape of a fork such as is shown in the drawing and the work piece is of a necked construction such as the kinescope 22 shown supported by the forked cradle 21, the cradle is maneuvered down and under the work piece (which may be supported in an upright position by a fixed stand which is not shown in the drawing). The operator then trips the electric switch 26 on the cradle energizing the solenoid valve 25. Compressed air is thus admitted to the cylinder 8. The air cylinder rod 9, and thus the rack 11 which is fixed to it, is moved in a downward direction for the apparatus shown in the drawing. The force urging the cable 19 in an upward direction is balanced against the force urging the cable downwardly, the latter force being due to the weight of the cable, the cradle and of the workpiece. The cradle holding the work piece may then be moved by an overriding force external of the apparatus in an upward or downward vertical direction or in a horizontal direction with relatively little physical effort on the part of the operator.

When the work piece, the kinescope 22, has been moved into the desired rest position the operator trips the electric switch 26 to its off position. This de-energizes the solenoid valve 25 (rotating the valve member 25a in the drawing about 90° in a clockwise direction) thereby exhausting the cylinder 8 to atmospheric pressure. The forked cradle may then be moved out from under the kinescope. The cradle may be easily moved down and under the kinescope when the air cylinder 8 is exhausted since the only force remaining which tends to urge the cradle in an upward direction is the force supplied by spring 16. When the operator releases his grip on the cradle, the spring causes the cradle to be slowly lifted to the out-of-the-way maximum overhead position.

While the preferred embodiment shown has been described with respect to kinescopes it will be realized that work pieces of different shapes may be lifted by the use of a cradle appropriate to the work piece handled.

It will be apparent from the foregoing description that a novel and advantageous lifting apparatus is provided wherein relatively sensitive lifting control of the movement of a relatively bulky, heavy, or hot work piece may be exercised by an operator with relatively little physical effort.

What is claimed is:

1. Lifting apparatus for lifting a work piece comprising moveable means supported for rotational movement, support means suspended from said moveable means and adapted to be raised and lowered from said moveable means and to support a work piece therein, driving means for rotating said moveable means in a direction raising said support means, and spring means for urging said moveable means in said direction, said spring means providing a force which is greater than the force represented by the weight of said support means and less than the force represented by the combined weight of said support means and a work piece, said driving means being adjustable to provide a force which is substantially equal to that represented by the weight of said support means and that of a work piece less the force of said spring means, whereby said support means is adapted to be supported against movement while supporting a work piece and to be raised when free of a work piece.

2. Lifting apparatus for lifting a work piece comprising a sheave supported for rotational movement, a cradle suspended from said sheave and adapted to be raised and lowered from said sheave and to support a work piece therein, driving means for rotating said sheave in a direction raising said cradle, and spring means for urging said sheave in said direction, said spring means providing a force which is greater than the force represented by the weight of said cradle and less than the combined weight of said cradle and a work piece, said driving means being adjustable to provide a predetermined non-variable force which is substantially equal to that represented by the combined weight of said cradle and a work piece supported therein less the force of said spring means, said driving means being yieldable to an overriding force external of said apparatus moving said cradle to any position throughout a given range of positions, whereby said cradle is adapted to be supported against movement while supporting a work piece and to be raised when free of a work piece.

3. Lifting apparatus for lifting a work piece comprising a frame, a sheave rotatable about a fixed axis with respect to said frame, a cradle suspended from said sheave and adapted to be raised and lowered from said sheave and to support a work piece therein, driving means including a pneumatically powered mechanism for rotating said sheave in a direction raising said cradle, and a spring connected at one end thereof to said sheave and at the other end thereof to said frame for urging said sheave in said direction with a force which is greater than the force represented by the weight of said cradle and less than the combined weight of said cradle and a work piece whereby said sheave is subjected to a force urging said cradle to rise when said cradle is free of a work piece, said driving means being adjustable to provide a force which is substantially equal to that represented by the weight of said cradle and that of a work piece less the force of said spring whereby said cradle is adapted to support a work piece therein against movement.

4. Lifting apparatus comprising a frame; a sheave rotatable about an axis fixed with respect to said frame; a cable fixed at one end thereof to said sheave and having a cradle extending from the other end thereof, said cradle being adapted to support a work piece therein, said sheave having a rim thereon spaced from said axis and adapted to support said cable around said rim; an extensible spring for urging said sheave to rotate in a direction raising said cradle and being fixed at one end thereof to said frame and at the other end thereof to a point on said sheave spaced from said axis, said spring adapted to produce a torque which is greater than the force represented by the weight of said cradle and said cable, and less than the force represented by the weight of said cradle, said cable, and said work piece; and drive means connected to said sheave for rotating said sheave in said direction, said drive means including a first sprocket coaxial with said sheave and being fixed thereto whereby the rotation of said sprocket effects a rotation of said sheave, a second sprocket rotatable about a second axis, an endless chain meshingly stretched for travel around said sprockets whereby a rotational force imparted to one of said sprockets imparts a rotational force to said other of said sprockets, a pneumatically energized drive mechanism for imparting rotational movement to said second sprocket, said mechanism including a cylinder having a diaphragm adapted to be pneumatically powered for movement in a substantially linear direction, means connecting said diaphragm to said second sprocket, said connecting means being adapted to convert linear motion of said diaphragm to rotary motion of said second sprocket whereby the admittance of air under pressure into said cylinder imparts a movement to said diaphragm which is communicated to said sheave in the form of a rotational force, said drive mechanism being adjustable to provide a rotational force which is substantially equal to the force urging the lowering of said cradle when a work piece is supported therein, whereby said cradle is adapted to be supported against movement while supporting a work piece and to be raised when free of a work piece.

5. Hoisting and handling apparatus comprising support means adapted to support a workpiece, first power means engaging said support means for providing a lifting force of a magnitude which is greater than the force represented by the weight of said support means, whereby said support means is lifted when it is free of a workpiece, second power means connected to said support means for adjustably providing a lifting force to said support means of a magnitude less by a predetermined value than the force represented by the weight of a workpiece, said predetermined value being substantially equal to the difference between the lifting force of said first power means and the force represented by the weight of said support means, whereby said support means is adapted to remain motionless at any vertical position within its range of movement when a work piece is supported within said support means and said first power means is energized.

6. Hoisting and handling apparatus comprising movable means supported for movement, support means suspended from said movable means and adapted to support a workpiece, power transfer means connected to said movable means for rotating the same, first power means engaging said movable means for providing a lifting force of a magnitude which is greater than the force represented by the weight of said support means, whereby said support means is lifted when it is free of a workpiece, second power means connected to said power transfer means for adjustably providing to said movable means a predetermined non-variable force equal to the difference between the lifting force of said first power means and the force represented by the weight of said support means and said workpiece, whereby said support means is adapted to remain motionless at any vertical position within its range of movement when a workpiece is supported within said support means and said first power means is energized.

7. Hoisting and handling apparatus comprising movable means, support means coupled to said movable means and adapted to support a workpiece, an extensible spring engaging said movable means for providing a lifting force which is greater than the force represented by the weight of said support means and less than the force represented by the combined weight of said support means and a work piece, whereby said support means is lifted when it is free of a work piece, and adjustable power means connected to said support means for providing a lifting force to said support means which is substantially equal to that represented by the weight of said support means and that of a work piece less the force of said spring means, whereby said support means is adapted to be supported against movement while supporting a workpiece and to be raised when free of a workpiece.

8. Hoisting and handling apparatus comprising movable means supported for rotational movement, support means suspended from said movable means and adapted to support a workpiece, power transfer means connected to said movable means for rotating the same, first power means engaging said movable means for providing a lifting force of a magnitude which is greater than the force represented by the weight of said support means, whereby said support means is lifted when it is free of a workpiece, adjustable second power means connected to said power transfer means for adjustably providing a lifting force to said movable means of a magnitude less by a predetermined value than the force represented by the weight of a work piece, said predetermined value being substantially equal to the difference between the lifting force of said first power means and the force represented by the weight of said support means, and power control means for controlling the energization of said second power means, whereby said support means is adapted to remain motionless at any vertical position within its range of movement when a workpiece is supported within said support means and said second power means is energized.

References Cited in the file of this patent

UNITED STATES PATENTS

| | | |
|---|---|---|
| 2,159,623 | Schmidt | May 23, 1939 |
| 2,246,923 | Meunier | June 24, 1941 |
| 2,481,037 | Pringle | Sept. 6, 1949 |
| 2,535,961 | Schutt | Dec. 26, 1950 |
| 2,600,887 | Lannen | June 17, 1952 |
| 2,624,470 | Geist | Jan. 6, 1953 |
| 2,680,004 | Herker | June 1, 1954 |
| 2,682,404 | Lund | June 29, 1954 |
| 2,710,107 | Powell | June 7, 1955 |